US006772946B2

United States Patent
Ruat et al.

(10) Patent No.: US 6,772,946 B2
(45) Date of Patent: Aug. 10, 2004

(54) CARD READER COMPRISING AN ENERGY-SAVING SYSTEM

(75) Inventors: Ludovic Ruat, Greasque (FR); Olivier Ferrand, Puyloubier (FR); Bruno Gailhard, Trets (FR)

(73) Assignee: STMicroelectronics SA, Montrouge (FR)

( * ) Notice: Subject to any disclaimer, the term of this patent is extended or adjusted under 35 U.S.C. 154(b) by 124 days.

(21) Appl. No.: 10/059,444

(22) Filed: Jan. 29, 2002

(65) Prior Publication Data

US 2002/0105234 A1 Aug. 8, 2002

Related U.S. Application Data

(63) Continuation-in-part of application No. PCT/FR00/02129, filed on Jul. 25, 2000.

(30) Foreign Application Priority Data

Jul. 30, 1999 (FR) .............................................. 99 10150

(51) Int. Cl.$^7$ ............................................. G06K 19/06
(52) U.S. Cl. ................................ 235/451; 235/492
(58) Field of Search ................................. 235/451, 492, 235/441, 491, 493, 375, 435, 380, 381, 482, 486, 487, 383, 462.15, 462.25; 307/139

(56) References Cited

U.S. PATENT DOCUMENTS 4,835,372 A * 5/1989 Gombrich et al. .......... 235/375
5,428,252 A    6/1995 Walker et al. ................ 307/64
5,686,714 A * 11/1997 Abe et al. .................... 235/435
5,949,047 A *  9/1999 Abe et al. .................... 235/435
2002/0105234 A1 * 8/2002 Ruat et al. ................... 307/139

FOREIGN PATENT DOCUMENTS

| EP | 0762307 | 3/1997 | ............ G06K/7/06 |
| EP | 0803831 | 10/1997 | ............ G06K/7/06 |
| EP | 0917086 | 5/1999 | ............ G06K/7/00 |
| EP | 0965942 | 12/1999 | ............ G06K/7/00 |

* cited by examiner

Primary Examiner—Thien M. Le
(74) Attorney, Agent, or Firm—Lisa K. Jorgenson; Allen, Dyer, Doppelt, Milbrath & Gilchrist, P.A.

(57) ABSTRACT

A smart card reader includes a housing for receiving a smart card, a microprocessor, and a connector for connecting the microprocessor to the received smart card for establishing communications therebetween. A voltage source provides a power supply voltage to the microprocessor based upon the smart card being received in the housing. The smart card reader further includes a first switch interposed between the voltage source and a power supply terminal of the microprocessor. The first switch is closed when the received smart card is at an end of travel in the housing so that the power supply voltage is provided to the microprocessor, and is opened when the received smart card is no longer at the end of travel in the housing so that the power supply voltage is not provided to the microprocessor.

32 Claims, 6 Drawing Sheets

CARD READER COMPRISING AN ENERGY-SAVING SYSTEM

RELATED APPLICATION

The present application is a continuation of International Application No. PCT/FR00/02129 filed on Jul. 25, 2000, the entire disclosure of which is being incorporated herein by reference.

FIELD OF THE INVENTION

The present invention relates to electronic devices, and more particularly, to a smart card reader.

BACKGROUND OF THE INVENTION

Figure 1:
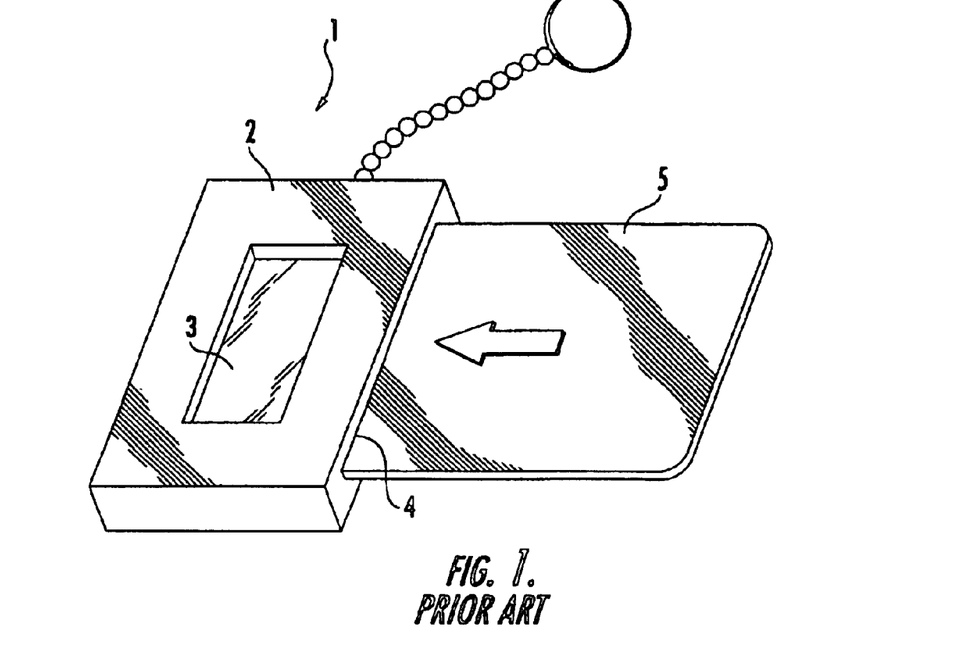
FIG. 1 illustrates an external view of a smart card reader of the viewer type according to the prior art.

An example smart card reader 1 known as a viewer is illustrated in FIG. 1. A viewer type card reader 1 generally comprises a small size case or housing 2, a display 3 and a slot 4 for receiving the smart card 5. Due to the reduced size of the case 2, only an end of the card 5 is received. This type of reader enables, for example, the number of remaining units in a phone card to be displayed, and the amount of money available in a smart card of the electronic purse type to be displayed. The reader 1 may be in the form of a key ring, as shown in FIG. 1.

Figure 2:
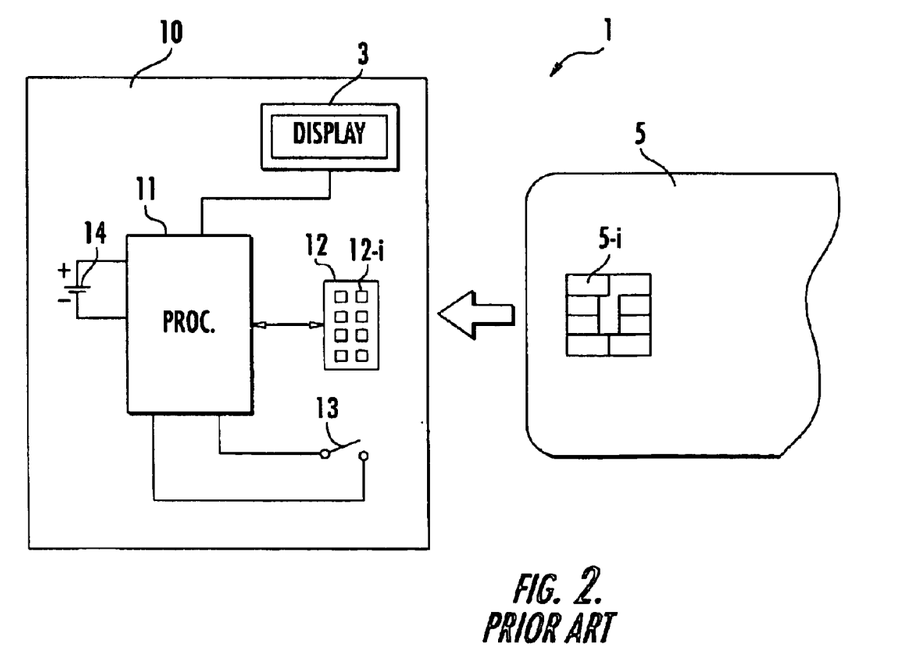
FIG. 2 is an electrical diagram of the smart card reader illustrated in FIG. 1.

As illustrated in FIG. 2, inside of such a reader 1 is generally a printed circuit board 10 on which a microprocessor 11, the display 3, a smart card connector 12, a travel end detector 13, and an electrical battery 14 providing electrical power to the microprocessor 11 are laid out on.

The microprocessor 11 is generally of the microcontroller type and includes on the same silicon chip various peripheral components such as an oscillator, a ROM type program memory, a RAM and/or EEPROM type data memory, and display drive circuits, etc. The connector 12, which is generally a friction type connector, for example, comprises metal pads 12-$i$ configured so that they coincide with the contact pads 5-$i$ of the smart card 5 when inserted in the reader 1.

The travel end detector 13 enables the microprocessor 11 to know whether a card 5 is inserted in the housing to initialize communication with the card. Since there is no protection in this type of reader against the card 5 being pulled out, conventionally, the microprocessor 11 is programmed so that it stops communicating with the card in a clean way, particularly when the card is suddenly removed from the reader. For this, the microprocessor 11 has a few milliseconds during which the metal pads 12-$i$ of the connector 12 are still in contact with the pads 5-$i$ of the card 5. The removal rate of the card 5 is on the order of 2 m/s. Stopping communications in a clean way includes sending a reset signal (RST) to the card 5 according to the ISO 7816 standard, for example.

Operation of reader 1 will now be discussed below. For periods of non-use, the microprocessor 11 places itself in an idle or standby state wherein its consumption is very low. This consumption is typically on the order of 1 to 10 $\mu$A according to the structure and complexity of the microprocessor 11.

When a card 5 is inserted into the housing and is at the end of travel therein, the closing of detector 13 triggers an interrupt in the microprocessor 11, which then initializes communication with the card 5 and displays the information contained therein. When the card 5 is removed, the opening of the detector 13 triggers a new interrupt and the microprocessor 11 switches back to the standby state. If the microprocessor 11 is still in communication with the card 5 at the instant of its removal, it interrupts communication with the card before placing itself in the idle state.

The main drawback of such a reader 1 is that it has a non-zero consumption of current when not in use, and a limited battery life time. Since the period of use of the reader 1 is insignificant with respect to the period of being idle, the consumption of the microprocessor 11 in the idle state, although minimal, has a significant influence on the life of the battery 14.

A smart card reader comprising a system for reducing the electrical power supply of the reader when a smart card is removed therefrom is disclosed in European Patent No. 762,307. This system comprises a switch detecting the presence of a smart card, which delivers an active signal to a circuit providing the power supply voltage for the reader. The system stops delivering the electrical power to the reader when this signal is emitted. However, the system requires a certain degree of complexity for having the power supply circuit react to the active signal delivered by the card detector.

A microprocessor provided with a system for detecting power supply voltage drops is also disclosed in U.S. Pat. No. 5,428,252. The power supply voltage is provided by a battery, and the detection system delivers an interrupt signal for a large drop in the power supply voltage. The interrupt signal enables the microprocessor to back up data before switching over to a sleep mode. Moreover, European Patent No. 803,831 describes a smart card reader comprising two switching means, one for activating the reader when a card is inserted therein and the other for detecting card removal to allow the reader to finish a current transaction.

SUMMARY OF THE INVENTION

An object of the present invention is to provide a straightforward and low cost approach for suppressing power consumption of a microprocessor in a smart card reader when a smart card is not in the reader.

Another object of the present invention is to suppress power consumption of the microprocessor while being able to properly interrupt communication with a smart card when the card is abruptly removed.

These objects are achieved by providing a smart card reader comprising a housing for receiving a smart card, a microprocessor, means for connecting the microprocessor to the smart card inserted in the housing, a voltage source, and means for not delivering to the microprocessor the voltage provided by the voltage source when the smart card is not in the housing. The means for not delivering to the microprocessor the voltage provided by the voltage source comprises a first switching means of the normally open type, interposed between the voltage source and a power supply terminal of the microprocessor. The first switching means is configured to close when a card is at the end of travel in the housing, and is configured to open when the card is no longer at the end of travel.

According to one embodiment, the microprocessor comprises means for detecting the opening of the first switching means, means for ending communication with a smart card if the first switching means opens during such a communication, and a capacitor for maintaining the power supply voltage of the microprocessor above a threshold when the first switching means switches from the closed state to the open state. This is done at least during the time necessary for the microprocessor to end a current communication.

According to one embodiment, the means for detecting opening of the first switching means comprise a comparator for comparing the power supply voltage of the microprocessor with a reference voltage. The reference voltage may be generated by the voltage delivered by the voltage source without passing through the first switching means. The reference voltage may be delivered by a voltage divider powered by the voltage source. The voltage divider may be connected to ground by a switch that is in the open state when the microprocessor is not powered.

According to one embodiment, the means for ending a communication comprise means for generating an interrupt signal when the comparator output changes its value as a result of the opening of the first switching means. The means for detecting an opening of the first switching means may comprise a second switching means that closes when a card is at the end of travel in the housing, and opens when the card is no longer at the end of travel in the housing. The second switching means has a first terminal connected with the voltage source, and a second terminal monitored by the microprocessor. The means for ending a communication may comprise means for generating an interrupt signal when the second switching means switches from the closed state to the open state.

The present invention also relates to a comparator including two input branches each comprising at least one ballast transistor and a control transistor for receiving the aforementioned power supply voltage and reference voltage. For example, the comparator may comprise an additional ballast transistor connected in parallel with a ballast transistor of one of the input branches, and means for connecting the control input of the additional ballast transistor to the control inputs of the other ballast transistors when the output voltage of the comparator is in a first state.

The comparator may further comprise means for blocking the additional ballast transistor when the output voltage of the comparator is in a second state. The comparator has a switching hysteresis depending on the state of its output. According to one embodiment, the comparator further comprises means for causing the additional ballast transistor to conduct during a transition period when the output voltage of the comparator switches from the second state to the first state.

The comparator may further comprise means for blocking the ballast transistors during a transition period when the output voltage of the comparator switches from the first state to the second state. The means for blocking or for causing the additional ballast transistor to conduct during a transition period may comprise means for delaying, during the transition period, the application of control signals that depend on the new state of the output of the comparator to the additional ballast transistor.

BRIEF DESCRIPTION OF THE DRAWINGS

These objects, features and advantages of the present invention will be discussed in more detail in the following description of two exemplary embodiments of a smart card reader according to the invention, made as non-limiting, with reference to the enclosed figures wherein.

DETAILED DESCRIPTION OF THE PREFERRED EMBODIMENTS

Figure 3:
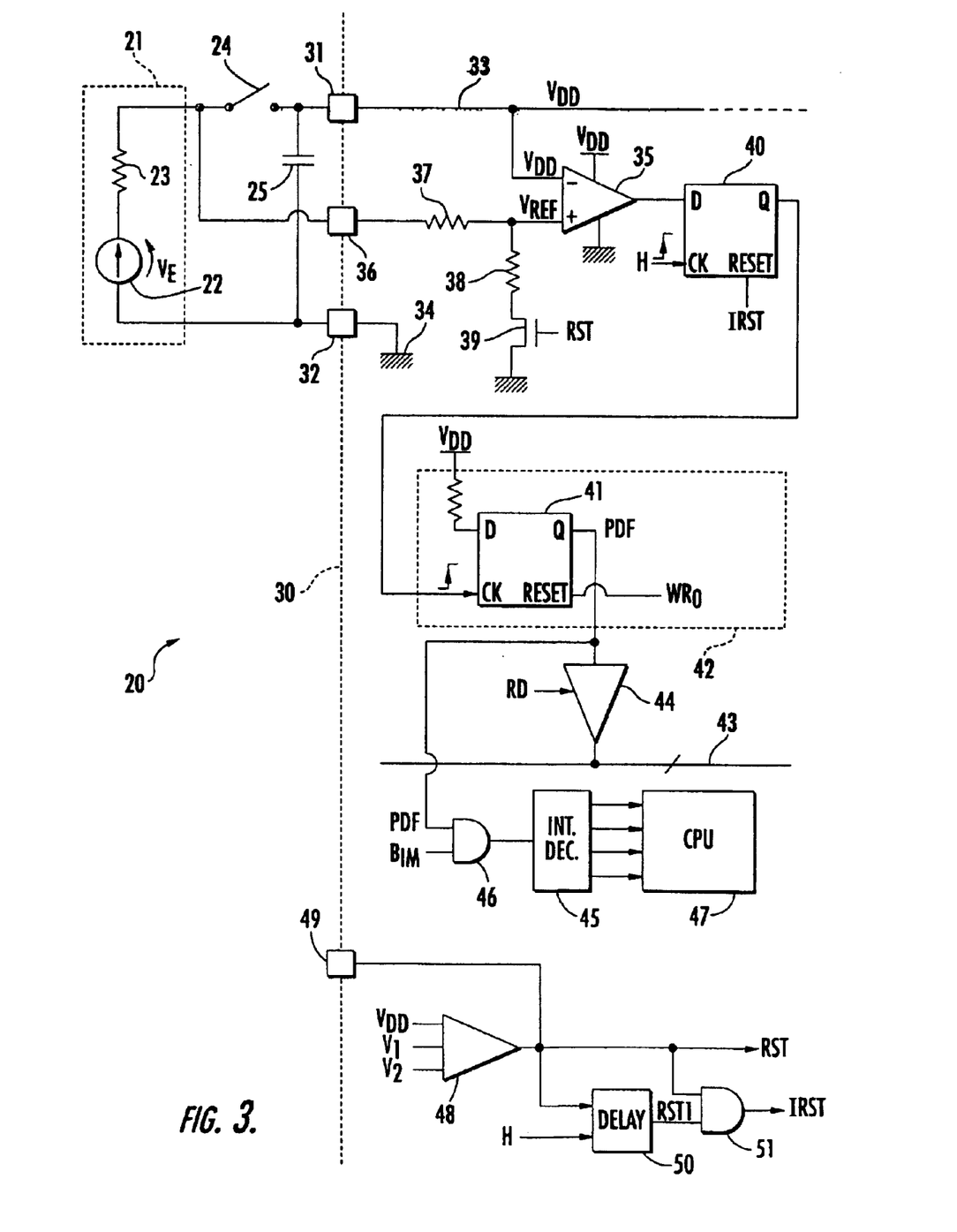
FIG. 3 is an electrical diagram of a first embodiment of a smart card reader comprising an energy-saving system according to the invention.

FIG. 3 illustrates the electrical diagram of a smart card reader 20 including an energy-saving system according to the invention. The general structure of the reader 20 complies with that of the conventional reader 1 illustrated in FIG. 1. The reader 20 comprises a case including a housing for receiving the card (not shown), an electrical battery 21, a microprocessor 30, as well as a display and a card connector which are not shown so that the figure may be simplified. Other peripheral components, notably a keyboard, may also be provided.

The right hand portion of FIG. 3, as separated by the dotted line, illustrates components of the energy-saving system according to the invention that are included in the microprocessor 30 for practical reasons, as well as the main hardware components of the microprocessor participating in the operation of the system. The other components of the microprocessor 30 are not illustrated for reasons of simplicity, as well as the peripheral components like the memory plane and the drivers for the display.

The microprocessor 30 conventionally comprises a power supply terminal 31 and a ground terminal 32 respectively connected to an internal power supply line 33 and to a ground plane 34. External the microprocessor, terminals 31 and 32 are respectively connected to the anode and cathode of the electrical battery 21. Battery 21 is illustrated by its equivalent circuit diagram, and comprises an ideal generator 22 delivering a voltage $V_E$ and a resistor 23 in series therewith. Resistor 23 is the internal resistance of the battery 21.

According to a first aspect of the invention, the power supply terminal 31 of the microprocessor is connected to the anode of the battery 21 via a travel end switch 24, which is normally open in the absence of a smart card. The switch 24 is of any known type, such as a flexible lever or a push button, for example.

Thus, the microprocessor 30 is only powered provided that a card is inserted into the reader and that it is pushed into its housing properly. Under these conditions, switch 24 is closed and the microprocessor receives a power supply voltage $V_{DD}$ substantially equal to voltage $V_E$, except in the case of high current consumption. When the card is removed from the housing or begins to be removed, switch 24 opens and the microprocessor 30 is no longer powered. The card reader 20 according to the invention thus has zero current consumption when not in use, and maximizes the life of the battery 21 or provides an optimum discharge time in the case of a rechargeable battery.

The reader 20 also comprises a capacitor 25 that is preferably external to the microprocessor 30, and is connected between the power supply terminal 31 and the ground terminal 32. The capacitor 25 enables the voltage $V_{DD}$ to be gradually applied to the microprocessor 30 upon the closing of the switch 24. Upon opening of the switch 24, the capacitor 25 maintains the voltage $V_{DD}$ for a few milliseconds or tens of milliseconds above a voltage threshold V2 during which the microprocessor 30 stops operating, as this will be seen later on. According to the invention, the microprocessor 30 also comprises means for detecting opening of the switch 24, and means for cleanly interrupting a communication with a smart card if the card is removed during such a communication.

A first embodiment of the detection means will now be discussed with reference to FIG. 3. The detection means comprises a comparator 35, the negative input of which is connected to the power supply terminal 31 and receives the power supply voltage $V_{DD}$. The positive input of the comparator 35 receives a reference voltage $V_{REF}$.

Advantageously, the reference voltage $V_{REF}$ is produced by the voltage $V_E$, without passing through switch 24, using a special terminal 36 of the microprocessor 30 directly connected to the anode of battery 21. Here, the reference voltage $V_{REF}$ is picked up at the middle point of a voltage divider bridge comprising two resistors 37 and 38. Resistor 37 is connected to terminal 36 and resistor 38 is connected to ground via a switch 39, for example, a MOS transistor. This switch 39 is driven by a reset signal RST from the microprocessor 30, as described later on.

The output of the comparator 35 is applied to the D input of a synchronous D flip-flop 40. The clock input CK of the flip-flop 40 receives the clock signal H from the microprocessor 30 and the RESET input receives an IRST signal. The Q output of the flip-flop 40 is applied to the clock input CK of a second synchronous D flip-flop 41. The D input of the flip-flop 41 is permanently held at 1 (voltage $V_{DD}$) and the RESET input receives a WR0 signal (zero write). The Q output of the flip-flop 41 delivers a power down flag PDF bit or flag so that the microprocessor 30 may know that a voltage cutoff is occurring as a result of switch 24 opening. Flip-flop 41 is a cell of a flag register 42, and the PDF flag may be sent onto the data bus 43 of the microprocessor 30 via a tristate buffer 44 controlled by a read signal RD. The PDF flag is also applied to an input of an interrupt decoder 45 via an AND gate 46 receiving on its other input an interrupt mask bit $B_{IM}$.

When the PDF flag is 1 and when the AND gate is transparent ($B_{IM}$ bit is 1), the interrupt decoder 45 delivers to the central processing unit (CPU) 47 of the microprocessor 30 an interrupt vector giving the address of a subprogram, which is conventional, and contains the necessary instructions for interrupting a current communication with a smart card.

Other components of the microprocessor 30 participating in the operation of the system according to the invention are illustrated at the bottom of FIG. 3. A conventional low voltage detector 48 with hysteresis receives as inputs the power supply voltage $V_{DD}$, and two reference voltages V1 and V2. The output of detector 48 delivers the RST signal for resetting the microprocessor 30 and is accessible through a terminal 49 for external resets. The output of detector 48 is applied to the input of a delay circuit 50, for example, a counter driven by the clock signal H. When the RST signal switches to 1, the delay circuit 50 delivers an RST1 signal set to 1 with a shift corresponding to a determined number of clock cycles. Signals RST and RST1 are combined in an AND gate 51, the output of which delivers an IRST signal for an internal reset of the microprocessor 30, well known to one skilled in the art.

Operation of the reader 20 according to the invention will now be described with reference to FIGS. 4A–4F. These figures respectively illustrate the curve of the power supply $V_{DD}$, the timing diagram of the RST signal, the timing diagram of the IRST signal, the curve of voltage $V_{REF}$, the curve of the differential voltage $V_{REF}$-$V_{DD}$ applied to the comparator 35, and the timing diagram of the PDF flag.

Figure 4A:
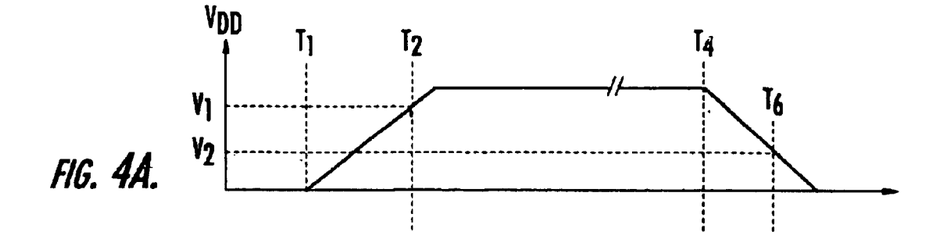
FIGS. 4A–4F illustrate different electrical signals for operation of the smart card reader illustrated in FIG. 3.
Figure 4B:
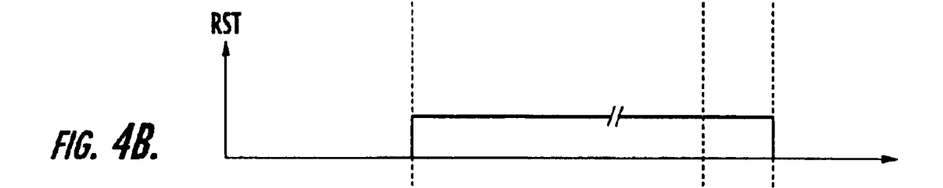
Figure 4C:
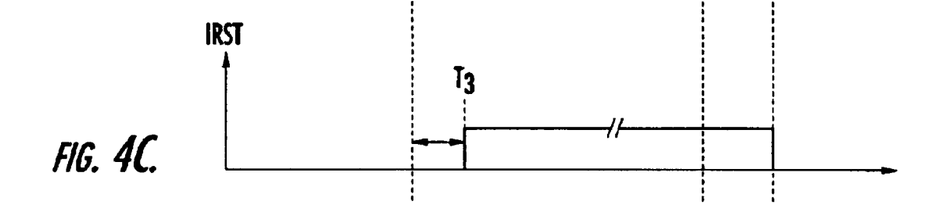
Figure 4D:
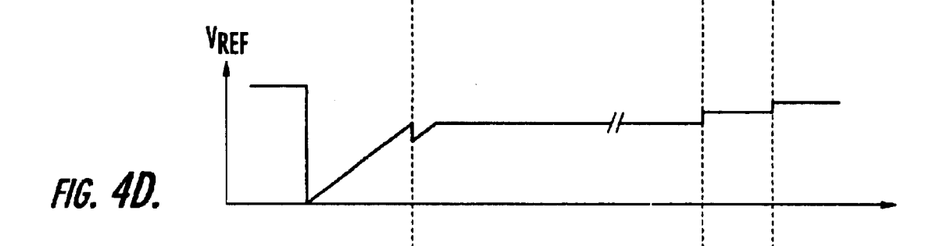

When a smart card is inserted, switch 24 closes at instant T1. Voltage $V_{DD}$ rises slowly (FIG. 4A) because of the charging of capacitor 25. Simultaneously, voltage $V_{REF}$ switches to 0 and increases to voltage $V_{DD}$ (FIG. 4B). At an instant T2, voltage $V_{DD}$ reaches the threshold V1 and the detector 48 sets the RST signal to 1 (FIG. 4B). Switch 39 conducts (FIG. 3), the divider bridge 37 and 38 conducts and voltage $V_{REF}$ is lowered substantially (FIG. 4D).

The differential voltage $V_{REF}$-$V_{DD}$ becomes less than 0 (FIG. 4E) and the output of the comparator 35 is held at 0. At an instant T3, occurring a few clock pulses H after the switching of signal RST to 1, circuit 50 sets the RST1 signal to 1 and the internal reset signal IRST switches to 1 (FIG. 4C). This instant T3 corresponds to all the components of the microprocessor 30 being put into service, which will then execute a procedure for querying and reading the smart card.

As compared with the prior art, switching on of the microprocessor triggers a communication with a smart card and not an interrupt generated by the closing of a travel end switch.

Now let us assume that the card is suddenly removed from its housing at an instant T4 when communication between the microprocessor 30 and the card is not finished. Switch 24 opens and the power supply voltage $V_{DD}$ starts to decrease slowly (FIG. 4A) because of the discharge of the capacitor 25. Also, the reference voltage $V_{REF}$ increases substantially because the microprocessor 30 no longer consumes the current delivered by the battery 21.

Figure 4E:
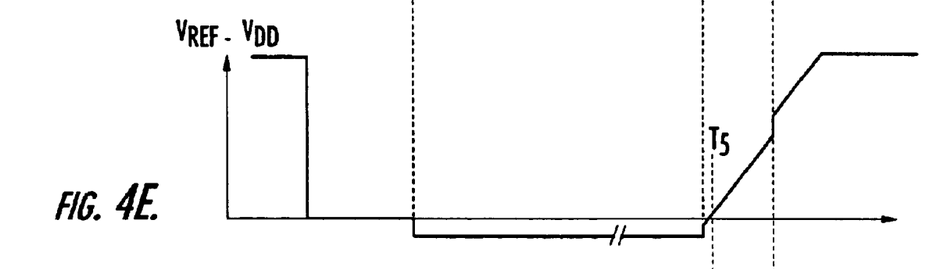
Figure 4F:
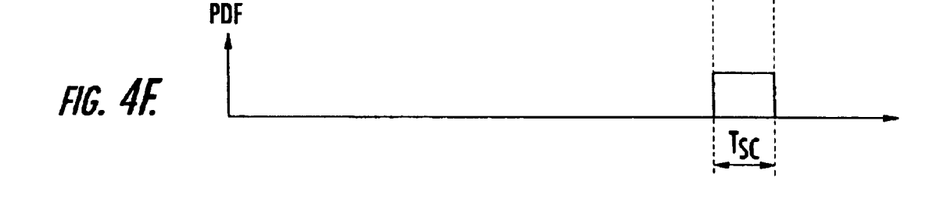

At an instant T5 very close to instant T4, voltage $V_{DD}$ becomes less than voltage $V_{REF}$ and the differential voltage $V_{REF}$-$V_{DD}$ becomes positive (FIG. 4E). With reference to FIG. 3, the output of the comparator 35 thus switches to 1. At the first next clock pulse H, the Q output of flip-flop 40 switches to 1 and enables the clock input CK of flip-flop 41, the Q output (PDF flag) of which also switches to 1. With the assumption that bit $B_{IM}$ was set to 1 at the beginning of the communication with the card, the PDF flag is transmitted to the input of the interrupt decoder 45. The latter then directs the microprocessor to the aforementioned communication interrupt subprogram.

Referring again to FIGS. 4A–4F, the microprocessor stops operating at instant T6 when voltage $V_{DD}$ reaches threshold V2 At that instant, detector 48 resets the RST signal to 0 and the IRST signal also switches to 0. The internal time $T_{SC}$ which elapses between instant T5 and T6, during which the PDF flag is set to 1 (FIG. 4F), thus determines the time available to the microprocessor 30 for interrupting a current communication with a smart card. This time interval is at least equal to the friction time of the contact pads of the cards on the connector of reader 20.

Figure 5:
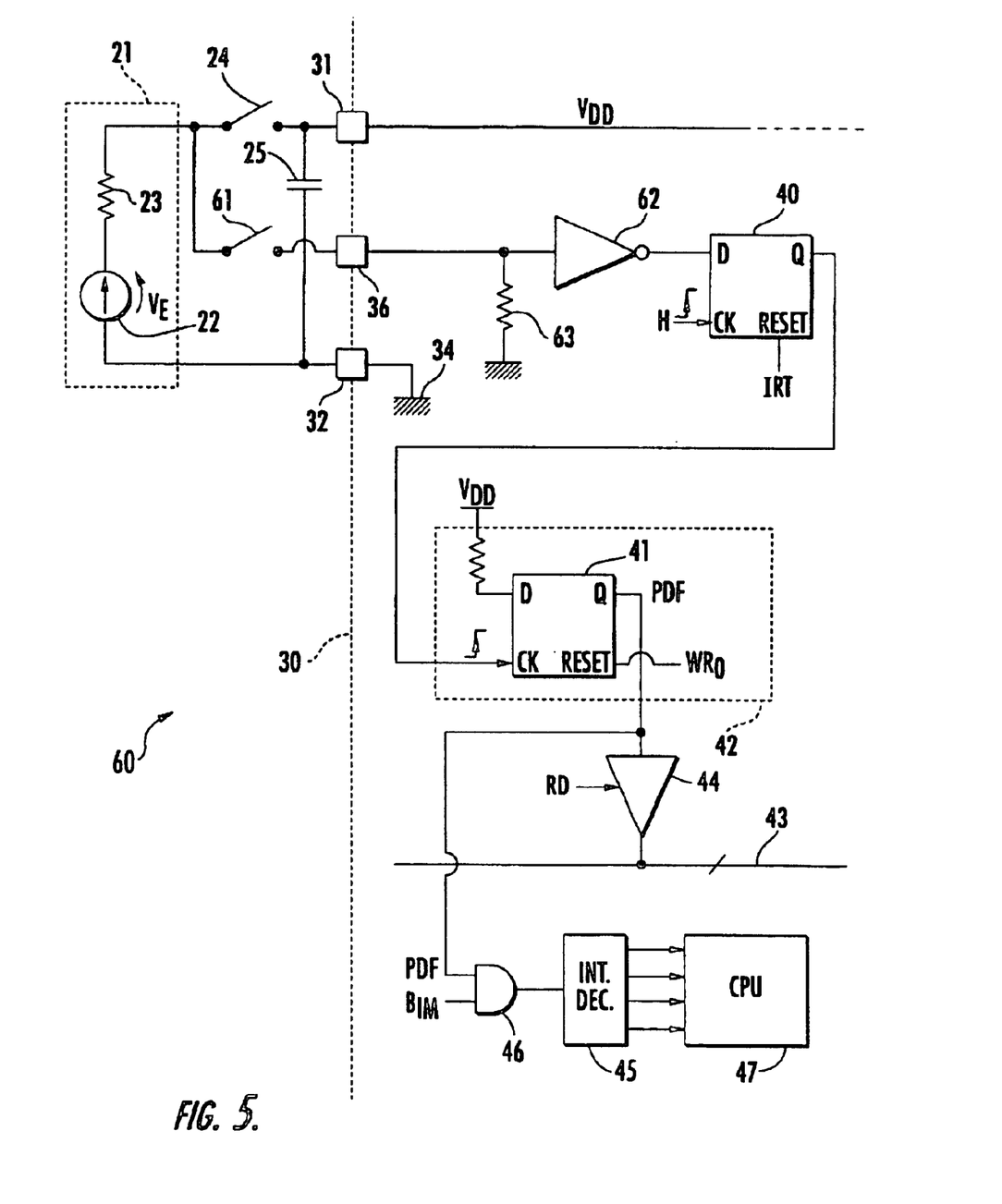
FIG. 5 is an electrical diagram of a second embodiment of a smart card reader according to the invention.

A second embodiment of the detection means will now be discussed with reference to FIG. 5. The illustrated reader 60 comprises different means for detecting opening of the switch 24. The comparator receiving the reference voltage $V_{REF}$ is not used. The terminal 36 of the microprocessor 30 is connected to the anode of the battery 21 via a second travel end switch 61, which opens and closes at the same instant as the switch 24. For example, switch 61 is placed adjacent to the switch 24 in the housing.

Terminal 36 is connected to the D input of flip-flop 40 via an inverter circuit 62, such as an inverting gate or a trigger with hysteresis. When switch 61 is open, the input of the inverter circuit 62 is held in the low state by a resistor 63. The resistor 63 has a very high value and is connected to ground. Except for these differences, the other components of reader 60 are the same as those of reader 20 of FIG. 3, and will not be further described.

When switch 61 opens, the output of the inverter circuit 62 switches to 1. The Q output of flip-flop 40 switches to 1 at the first next clock pulse H, causing the switching of flag PDF to 1 at the output of flip-flop 41, and the triggering of an interrupt sending the microprocessor 30 to the aforementioned subprogram.

It will be clearly apparent to one skilled in the art that the present invention is open to various other alternatives and embodiments. Although the invention was designed for meeting the need of saving energy in small readers of the viewer type powered by a battery, the invention may however be applied to any type of reader. Also, it will be noted that the present invention is applicable to contactless smart card readers, i.e., proximity contactless readers. Proximity contactless readers require insertion of a card into a housing and differ simply from contact readers by the fact that the means for connecting the microprocessor to the card assumes the form of an inductive coupling interface using an antenna coil, instead of assuming the form of a friction connector. In the present application, the term connection means should therefore not be interpreted in a restrictive way.

Exemplary embodiments of a comparator will now be discussed. The first embodiment of the invention described above with reference to FIG. 3 involves a comparator 35 for detecting a drop of the power supply voltage $V_{DD}$ under the threshold $V_{REF}$. This comparator 35 should provide characteristics which conventional comparators do not have, notably good stability of its output voltage. The output of the comparator 35 should be prevented from oscillating between 0 and 1 when the voltage $V_{DD}$ slowly approaches voltage $V_{REF}$ after the switch 24 opens.

Figure 6:
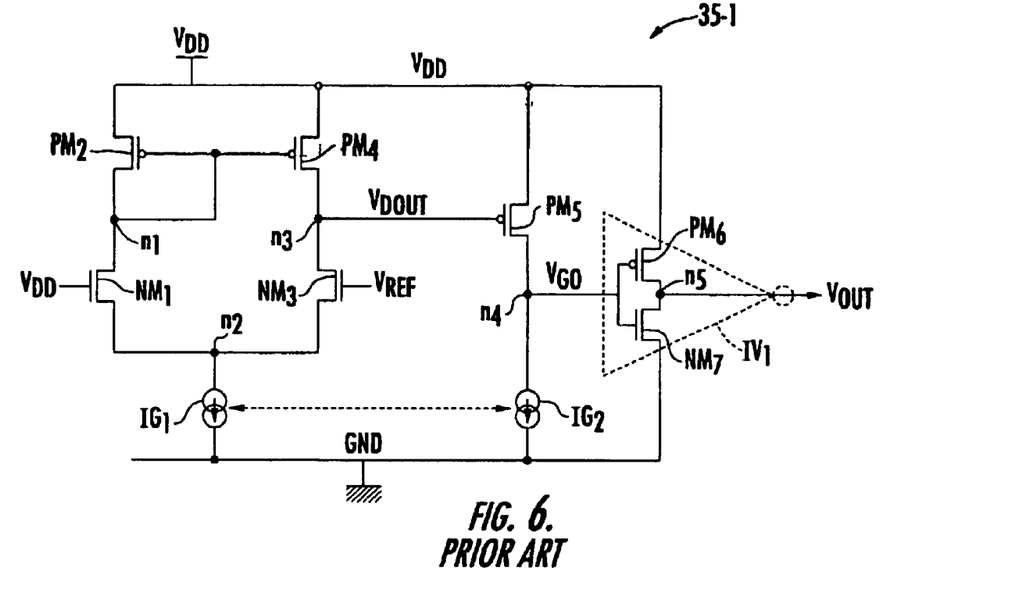
FIG. 6 is an electrical diagram of a comparator according to the prior art.
Figure 7:
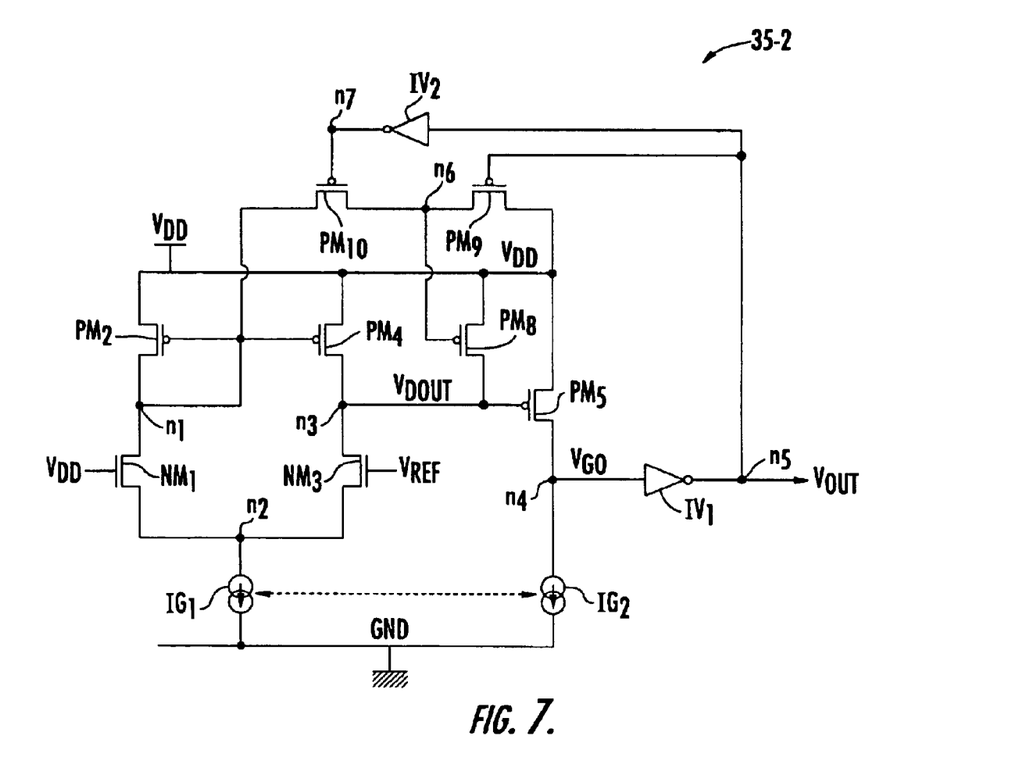
FIG. 7 is an electrical diagram of a first comparator with hysteresis according to the invention.
Figure 8:
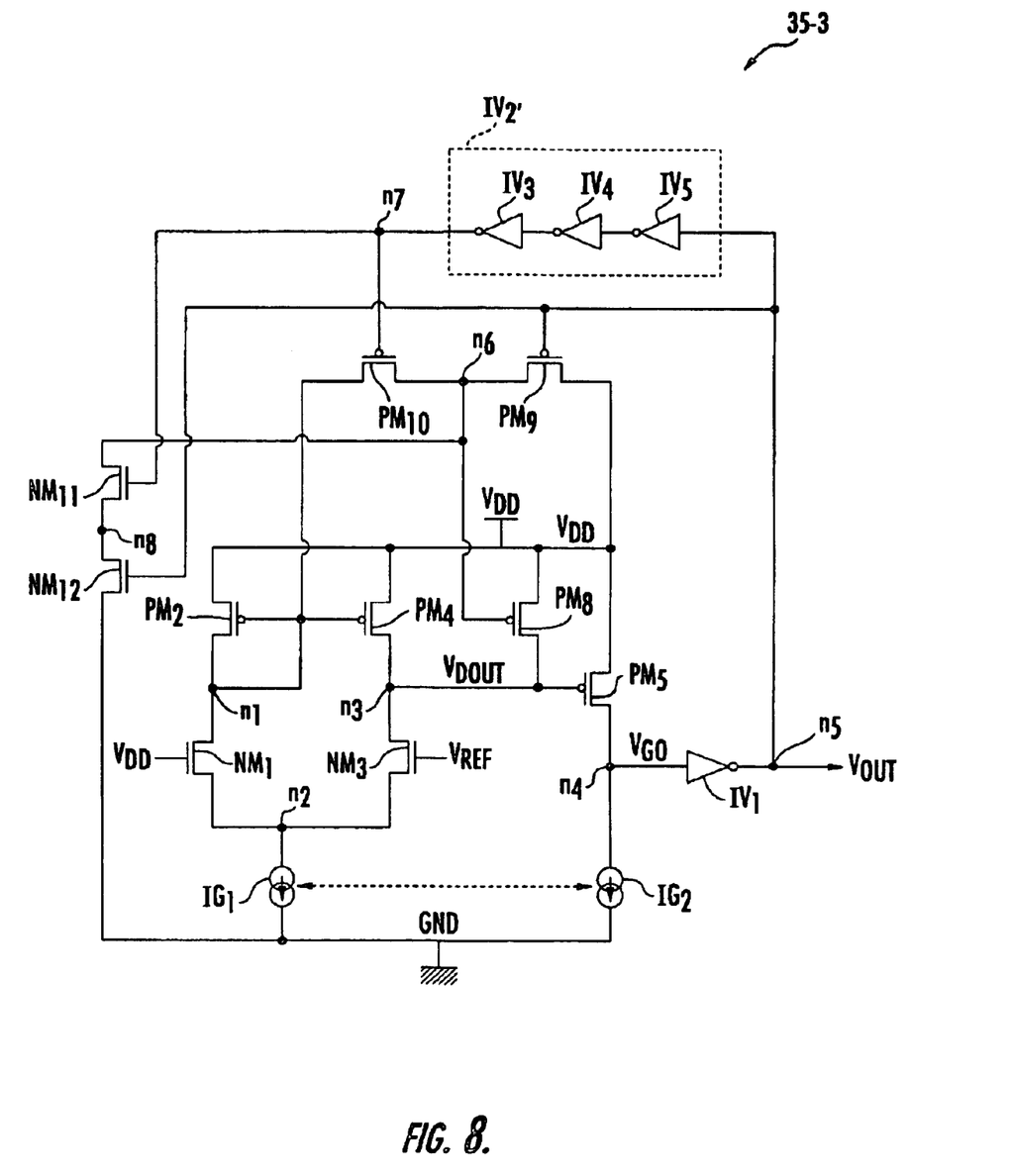
FIG. 8 is an electrical diagram of a second comparator with hysteresis according to the invention.

FIGS. 1, 2 and 8 respectively illustrate the electrical diagram of a conventional comparator 35-1, the electrical diagram of a comparator with hysteresis 35-2, and the electrical diagram of a preferred embodiment of a comparator with hysteresis 35-3 according to the invention.

Tables 1, 2 and 3 describe the structure of comparators 35-1, 35-2, 35-3 by showing their components and the interconnection of these components. Components referenced as $NM_i$ are NMOS transistors and components referenced as $PM_i$ are PMOS transistors. Components referenced as $n_i$ are interconnection nodes, and components IG1, IG2 are current generators configured as current mirrors. Components referenced as $IV_i$ are inverting gates. Transistors NM7 and PM8 form an inverting gate IV1 delivering the output voltage $V_{OUT}$ of the comparator.

A same basic structure is found in the three comparators, which comprises an input stage and an output transistor PM5 driving the input of the inverting gate IV1. The input stage comprises two branches with each branch including a respective ballast transistor PM2, PM4 and a control transistor NM1, NM3.

In the conventional comparator 35-1 of FIG. 6, transistors PM2 and PM4 have the same W/L ratio (gate width over length). This comparator has the drawback of being unstable when voltage $V_{DD}$ decreases and approaches voltage $V_{REF}$. In this case, both input branches are actually balanced and the voltage $V_{DOUT}$, which controls the output transistor PM5 is able to oscillate.

TABLE 1

Comparator 35-1 (FIG. 6)

| Transistors | Source | Drain | Gate |
|---|---|---|---|
| NM1 | n1 | n2 | $V_{DD}$ |
| PM2 | $V_{DD}$ | n1 | n1 |
| NM3 | n3/$V_{DOUT}$ | n2 | $V_{REF}$ |
| PM4 | $V_{DD}$ | n3/$V_{DOUT}$ | n1 |
| PM5 | $V_{DD}$ | n4/$V_{GO}$ | n3/$V_{DOUT}$ |
| PM6 | $V_{DD}$ | n5/$V_{OUT}$ | n4/$V_{GO}$ |
| NM7 | n5 | GND (ground) | n4/$V_{GO}$ |

| Other components | Input | Output |
|---|---|---|
| IG1 | n2 | GND |
| IG2 | n4 | GND |
| IV1 (NM7 + PM8) | n4 | n5/$V_{OUT}$ |

TABLE 2

Comparator 35-2 (FIG. 7)

| Transistors | Source | Drain | Gate |
|---|---|---|---|
| NM1 | n1 | n2 | $V_{DD}$ |
| PM2 | $V_{DD}$ | n1 | n1 |
| NM3 | n3/$V_{DOUT}$ | n2 | $V_{REF}$ |
| PM4 | $V_{DD}$ | n3/$V_{DOUT}$ | n1 |
| PM5 | $V_{DD}$ | n4/$V_{GO}$ | n3/$V_{DOUT}$ |
| PM6 | $V_{DD}$ | n5/$V_{OUT}$ | n4/$V_{GO}$ |
| NM7 | n5 | GND (ground) | n4/$V_{GO}$ |
| PM8 | $V_{DD}$ | n3/$V_{DOUT}$ | n6 |
| PM9 | $V_{DD}$ | n6 | n5/$V_{DOUT}$ |
| PM10 | n6 | n1 | n7/NOT $V_{DOUT}$ |

| Other components | Input | Output |
|---|---|---|
| IG1 | n2 | GND |
| IG2 | n4 | GND |
| IV1 (NM7 + PM8) | n4 | n5/$V_{OUT}$ |
| IV2 | | n7 |

TABLE 3

Comparator 35-3 (FIG. 8)

| Transistors | Source | Drain | Gate |
|---|---|---|---|
| NM1 | n1 | n2 | $V_{DD}$ |
| PM2 | $V_{DD}$ | n1 | n1 |
| NM3 | n3/$V_{DOUT}$ | n2 | $V_{REF}$ |
| PM4 | $V_{DD}$ | n3/$V_{DOUT}$ | n1 |
| PM5 | $V_{DD}$ | n4/$V_{GO}$ | n3/$V_{DOUT}$ |
| PM6 | $V_{DD}$ | n5/$V_{OUT}$ | n4/$V_{GO}$ |
| NM7 | n5 | GND (ground) | n4/$V_{GO}$ |
| PM8 | $V_{DD}$ | n3/$V_{DOUT}$ | n6 |
| PM9 | $V_{DD}$ | n6 | n5/$V_{DOUT}$ |
| PM10 | n6 | n1 | n7/NOT $V_{DOUT}$ |
| NM11 | n6 | n8 | n7 NOT $V_{DOUT}$ |
| NM12 | n8 | GND | n5/$V_{DOUT}$ |

| Other components | Input | Output |
|---|---|---|
| IG1 | n2 | GND |
| IG2 | n4 | GND |
| IV1 (NM7 + PM8) | n4 | n5/$V_{OUT}$ |
| IV2' | n5/$V_{OUT}$ | n7 |

In the comparator 35-2 of FIG. 7, the ballast transistor PM8 is added in parallel with the ballast transistor MP4 of the second branch. Transistors PM2, PM4 and PM8 are designed in such a way that their respective gate widths W2, W4 and W8 meet the following relationship:

$$W2=W4+W8 \quad (1)$$

Accordingly, the differential voltage which should be applied at the input of the comparator in order to balance both input branches is different according to whether $V_{OUT}$ switches from $V_{DD}$ to 0 or from 0 to $V_{DD}$. The first balance differential voltage is greater than 0 when transistor PM8 is blocked, as the gate of transistor PM4 is not as wide as the gate of transistor PM2. Transistor PM8 is blocked when the output voltage $V_{OUT}$ is equal to 0. The transistor PM9 then conducts and the gate of the transistor PM8 is brought to voltage $V_{DD}$. The second balance differential voltage is equal to 0 when transistor PM8 is conducting because of the above relationship (1). Transistor PM8 is conducting when the output voltage $V_{OUT}$ is equal to $V_{DD}$, transistor PM10 then conducts (node n7 set to 0) and node n6 is connected to node n1.

Thus, the comparator 35-2 has the advantage of providing a switching hysteresis, i.e., a differential voltage $V_{REF}-V_{DD}$ for switching to the high state ($V_{OUT}=V_{DD}$) different from the differential voltage for switching to the low state ($V_{OUT}=0$). The output voltage $V_{OUT}$, once it has switched to the high state, remains stable as long as voltage $V_{DD}$ continues to decrease.

In the comparator 35-3 of FIG. 8, the inverting gate IV2 is replaced with an inverting gate IV2' with a longer switching time and transistors NM11 and NM12 are added. When the output voltage $V_{OUT}$ is equal to $V_{DD}$, transistor PM9 is blocked and transistor PM10 is conducting. Node n1 is connected to node n6. The ballast transistors PM2, PM4 and PM8 have the same gate voltage.

When voltage $V_{OUT}$ then switches from $V_{DD}$ to 0, transistor PM9 conducts and transistor PM10 remains conducting as long as the output of the inverting gate IV2' is not at $V_{DD}$. Voltage $V_{OUT}$ is therefore applied back on the node n1 of the input branch of the comparator during the transition period. The result is that the output $V_{OUT}$ is further forced towards zero when the comparator is not stabilized. Transistors NM11 and NM12 remain blocked during this transition period.

When the output voltage $V_{OUT}$ switches from 0 to $V_{DD}$, the stabilization of the comparator during the transition period is provided by transistors NM1 and NM12. Transistor NM12 conducts and transistor NM11 remains conducting as long as the output of gate IV2' does not switch to 0. As both transistors NM11 and NM12 are conducting, the node n6 which controls the transistor PM8 is forced to 0 and transistor PM8 is conducting. Transistors PM9 and PM10 remain blocked during this transition period.

The comparator 35-3 provides the advantage of being very stable when the differential voltage changes very slowly, as this may be the case when the capacitor 25 of FIG. 3 has a high electrical capacitance. As comparators 35-2, 35-3 have for practical reasons, an output voltage inverted with respect to that of the comparator 35 described above, an inverting gate may be added between the output of these comparators and the flip-flop 40 of FIG. 3. As another solution, the inverted output/Q of the flip-flop 40 may be connected to the flip-flop 41 rather than to its Q output.

Comparators 35-2, 35-3 are open to alternative embodiments which are within the reach of one skilled in the art by applying the principles which have just been described. They are also open to different applications, other than the one corresponding to the implementation of the smart card reader illustrated in FIG. 3, and may thus form an independent invention.

That which is claimed is:

1. A smart card reader comprising:
   a housing having an opening therein for receiving a smart card;
   a microprocessor carried by said housing;
   a connector carried by said housing for connecting said microprocessor to the received smart card for establishing communications therebetween;
   a voltage source carried by said housing for providing a power supply voltage to said microprocessor based upon the smart card being received in the opening of said housing; and
   a first switch interposed between said voltage source and a power supply terminal of said microprocessor, said first switch being closed when the received smart card is in the opening of said housing so that the power supply voltage is provided to said microprocessor, and being opened when the received smart card is no longer in the opening of said housing so that the power supply voltage is not provided to said microprocessor.

2. A smart card reader according to claim 1, wherein said microprocessor comprises:
   a detection circuit for detecting opening of said first switch; and
   a stop circuit connected to said detection circuit for ending communications with the received smart card if said first switch opens during the communications;
   said smart card reader further comprising a capacitor connected to said first switch and to said voltage source for holding the power supply voltage above a threshold when said first switch switches from closed to open, the power supply voltage being held above the threshold for at least a time required for said microprocessor to end a current communications with the received smart card.

3. A smart card reader according to claim 2, wherein said detection circuit comprises a comparator circuit for comparing the power supply voltage to a first reference voltage.

4. A smart card reader according to claim 3, wherein the first reference voltage is the power supply voltage delivered by said voltage source without passing through said first switch.

5. A smart card reader according to claim 4, wherein said microprocessor further comprises a voltage divider connected between said comparator circuit and said voltage source for dividing the power supply voltage to the first reference voltage.

6. A smart card reader according to claim 5, further comprising a voltage divider switch for connecting said voltage divider to a second reference voltage, said voltage divider switch being opened when said microprocessor is not receiving the power supply voltage.

7. A smart card reader according to claim 3, wherein said stop circuit generates an interrupt signal when an output of said comparator circuit changes as a result of said first switch being opened.

8. A smart card reader according to claim 2, further comprising a second switch interposed between said voltage source and said microprocessor, said second switch being closed when the received smart card is at an end of travel in the opening of said housing, and being opened when the smart card is no longer at the end of travel in the opening of said housing.

9. A smart card reader according to claim 8, wherein said second switch is monitored by said microprocessor.

10. A smart card reader according to claim 8, wherein said stop circuit generates an interrupt signal when said second switch switches from closed to open.

11. A smart card reader according to claim 1, wherein said voltage source comprises a battery.

12. A smart card reader according to claim 3, wherein said comparator circuit comprises:
   two input branches for receiving the power supply voltage and the first reference voltage, each input branch comprising at least one ballast transistor and a control transistor connected thereto;
   an additional ballast transistor connected in parallel with one of said at least one ballast transistors;
   a connection circuit for connecting a control input of said additional ballast transistor to a control input of said at least one ballast transistor in each branch when an output of said comparator circuit is in a first state; and
   a blocking circuit for blocking said additional ballast transistor when the output of said comparator circuit is in a second state, said blocking circuit having a switching hysteresis based upon the output of said comparator circuit being in the first or second state.

13. A smart card reader according to claim 12, wherein said additional ballast transistor conducts during a transition period when the output of said comparator circuit switches from the second state to the first state.

14. A smart card reader according to claim 13, wherein at least one ballast transistor in each branch is blocked during the transition period when the output of said comparator circuit switches from the first state to the second state.

15. A smart card reader according to claim 13, wherein application of control signals to said additional ballast transistor are delayed during the transition period.

16. A smart card reader comprising:
   a housing having an opening therein for receiving a smart card;
   a microprocessor carried by said housing;
   a voltage source carried by said housing for providing a power supply voltage to said microprocessor based upon the smart card being received in the opening of said housing;
   a first switch interposed between said voltage source and a power supply terminal of said microprocessor, said first switch being closed when the received smart card is at an end of travel in the opening of said housing so that the power supply voltage is provided to said microprocessor, and being opened when the received smart card is no longer at the end of travel in the opening of said housing so that the power supply voltage is not provided to said microprocessor; and
   a capacitor connected to said first switch and to said voltage source for holding the power supply voltage above a threshold when said first switch switches from closed to open so that said microprocessor has time to end a current communications with the received smart card.

17. A smart card reader according to claim 16, further comprising a connector carried by said housing for connecting said microprocessor to the received smart card for establishing communications therebetween.

18. A smart card reader according to claim 16, wherein said microprocessor comprises:
   a detection circuit for detecting opening of said first switch; and
   a stop circuit connected to said detection circuit for ending communications with the received smart card if said first switch opens during the current communications.

19. A smart card reader according to claim 18, wherein said detection circuit comprises a comparator circuit for comparing the power supply voltage to a first reference voltage.

20. A smart card reader according to claim 19, wherein the first reference voltage is the power supply voltage delivered by said voltage source without passing through said first switch.

21. A smart card reader according to claim 18, wherein said stop circuit generates an interrupt signal when an output of said comparator circuit changes as a result of said first switch being opened.

22. A smart card reader according to claim 18, further comprising a second switch interposed between said voltage source and said microprocessor, said second switch being closed when the received smart card is at the end of travel in the opening of said housing, and is opened when the smart card is no longer at the end of travel in the opening of said housing.

23. A smart card reader according to claim 22, wherein said stop circuit generates an interrupt signal when said second switch switches from closed to open.

24. A smart card reader according to claim 19, wherein said comparator circuit comprises:
   two input branches for receiving the power supply voltage and the reference voltage, each input branch comprising at least one ballast transistor and a control transistor connected thereto;
   an additional ballast transistor connected in parallel with one of said at least one ballast transistors;
   a connection circuit for connecting a control input of said additional ballast transistor to a control input of said at least one ballast transistor in each branch when an output of said comparator circuit is in a first state; and
   a blocking circuit for blocking said additional ballast transistor when the output of said comparator circuit is in a second state, said blocking circuit having a switching hysteresis based upon the output of said comparator circuit being in the first or second state.

25. A method for providing a power supply voltage to a microprocessor in a smart card reader comprising a housing having an opening therein for receiving a smart card, and a voltage source carried by the housing, the method comprising:
   closing a first switch interposed between the voltage source and a power supply terminal of the microprocessor when the received smart card is in the opening of the housing so that the power supply voltage is provided to the microprocessor; and
   opening the first switch when the received smart card is no longer in the opening of the housing so that the power supply voltage is not provided to the microprocessor.

26. A method according to claim 25, further comprising:
   detecting opening of the first switch; and
   ending communications with the received smart card if the first switch opens during the communications.

27. A method according to claim 26, wherein the smart card reader further comprises a capacitor connected to the first switch and to the voltage source; and further comprising holding the power supply voltage above a threshold when the first switch switches from closed to open so that the microprocessor has time to end a current communications with the received smart card.

28. A method according to claim 25, further comprising detecting opening of the first switch by comparing the power supply voltage to a first reference voltage.

29. A method according to claim 28, wherein the microprocessor comprises a comparator circuit for detecting opening of the first switch; and further comprising generating an interrupt signal when an output of the comparator circuit changes as a result of the first switch being opened.

30. A method according to claim 25, wherein the smart card reader further comprises a second switch interposed between the voltage source and the microprocessor; and further comprising:

closing the second switch when the received smart card is at an end of travel in the opening of the housing; and opening the second switch when the smart card is no longer at the end of travel in the opening of the housing.

31. A method according to claim 30, further comprising monitoring the second switch by the microprocessor.

32. A method according to claim 30, further comprising generating an interrupt signal when the second switch switches from closed to open.

* * * * *